United States Patent [19]

Burandt

[11] Patent Number: 4,605,358
[45] Date of Patent: Aug. 12, 1986

[54] INTEGRATED POWER DRIVE AND POWER TRANSFER SYSTEM

[75] Inventor: Wesley A. Burandt, Rockford, Ill.

[73] Assignee: Sundstrand Corporation, Rockford, Ill.

[21] Appl. No.: 685,909

[22] Filed: Dec. 24, 1984

[51] Int. Cl.$^4$ .................. F04B 35/00; F16H 39/14; F16H 39/00

[52] U.S. Cl. .................. 417/236; 417/271; 74/730; 74/675; 74/789

[58] Field of Search .................. 417/236, 237, 271; 74/687, 730, 789, 675

[56] References Cited

U.S. PATENT DOCUMENTS

| | | | |
|---|---|---|---|
| 2,578,015 | 12/1951 | Reinhard | 318/8 |
| 2,763,823 | 9/1956 | Symes | 318/8 |
| 2,806,191 | 9/1957 | Montrose-Oster | 318/8 |
| 3,081,647 | 3/1963 | Blenkle | 74/710.5 |
| 3,090,252 | 5/1963 | Mamo | 74/677 |
| 3,143,693 | 8/1964 | Fearnside et al. | 318/8 |
| 3,161,083 | 12/1964 | Roe | 74/675 |
| 3,199,376 | 8/1965 | DeLalio | 74/687 |
| 3,306,129 | 2/1967 | DeLalio | 74/687 |
| 3,855,879 | 12/1974 | DeLalio | 74/687 |
| 3,990,327 | 11/1976 | Margolin | 74/687 |
| 4,196,644 | 4/1980 | Orshansky, Jr. | 74/730 |
| 4,242,022 | 1/1981 | Baudoin | 74/687 |
| 4,261,226 | 4/1981 | Orshansky, Jr. | 74/730 |
| 4,306,467 | 12/1981 | Pollmann | 74/687 |
| 4,363,247 | 12/1982 | Weseloh | 74/789 |

Primary Examiner—William L. Freeh
Attorney, Agent, or Firm—Wood, Dalton, Phillips, Mason & Rowe

[57] ABSTRACT

In many aircraft, there are flight control surfaces positioned by mechanical actuation systems that are driven by hydraulic power drive units. There are also devices for transmitting hydraulic power from one aircraft hydraulic system to another in the event that one of the system's pumps fails. An integration of structure to perform both of these functions in a single unit would result in a reduction in cost and weight as well as increased reliability. The integrated power drive and power transfer system has a pair of variable displacement hydraulic devices each in a separate hydraulic circuit and each having a drive shaft connected into a summing gear train connected to an output shaft. A selectively-operable brake is in the operative connection between the output shaft and the summing gear train and controls either driving of the output shaft with both variable displacement hydraulic devices operating as motors or transfer of power between the hydraulic circuits with one variable displacement hydraulic device operating as a motor and the other as a pump.

16 Claims, 5 Drawing Figures

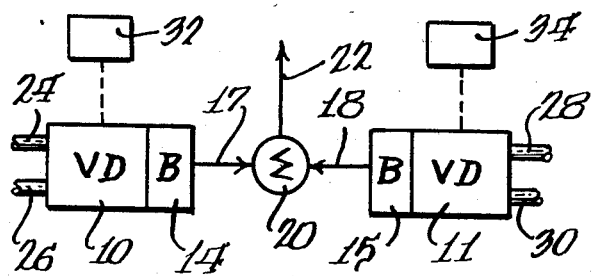
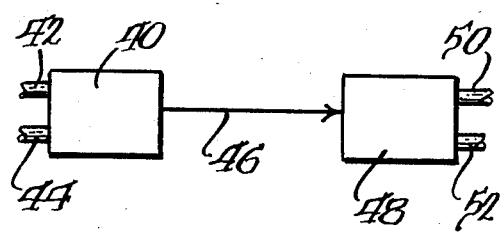
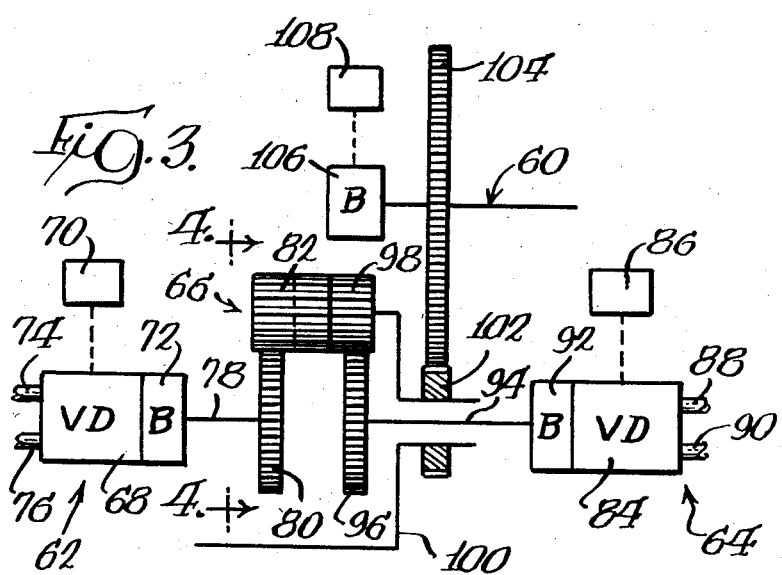
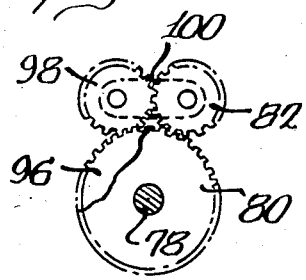
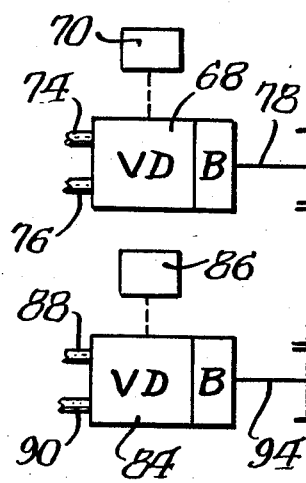
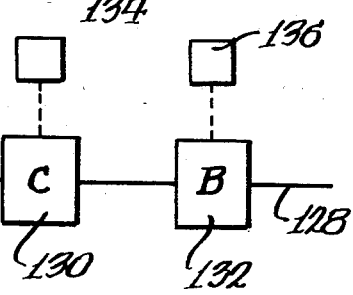

INTEGRATED POWER DRIVE AND POWER TRANSFER SYSTEM

FIELD OF THE INVENTION

This invention relates to an integrated power drive and power transfer system wherein a pair of power conversion devices are integrated to enable operation of the devices to either provide a common mechanical output or transfer power from one power conversion device to the other in the event there is a failure of a power source in one of the power conversion devices.

BACKGROUND OF THE INVENTION

Many aircraft have flight control surfaces that are controlled by mechanical actuation systems that are driven by hydraulic power drive units. The aircraft also has other hydraulically powered devices in a separate hydraulic power drive system. A hydraulic power transfer unit is used for transmitting power from one aircraft hydraulic system to another in the event that a pump in one of the hydraulic systems fails.

A mechanical actuation system for a flight control surface, such as a flap, may be in the form of a ballscrew actuator with a drive input derived from a power drive unit of the type disclosed in my prior application, Ser. No. 363,701, filed Mar. 30, 1982. A power drive unit can incorporate a variable displacement axial piston hydraulic displacement device having a rotatable drive shaft that can be connected to a load, such as a ballscrew actuator. Additionally, the power drive unit has a pump as a source of hydraulic power connected to the hydraulic displacement device and with there being suitable controls for setting the displacement of the hydraulic displacement device and the control of hydraulic flow thereto.

It is also known to provide for redundancy in the mechanical actuation system by having a pair of power drive units both connected to the mechanical actuation system in order to assure operation of the flight control surfaces, even though there may be a failure in one of the power drive units. An illustration of such a redundant system is shown in FIG. 1 wherein a pair of variable displacement hydraulic devices of separate power drive units have their drive shafts connected to a speed-summing gear train which may be in the form of a differential and which has an output which is connectable to the mechanical actuation system. It is a characteristic of the speed-summing gear train that the mechanical actuation system can be driven by both of the hydraulic displacement devices or driven by only one of the hydraulic displacement devices when the other is inoperable.

A typical prior art hydraulic power transfer unit for transferring hydraulic power from one hydraulic circuit to another has a pair of hydraulic displacement devices in the separate hydraulic circuits and which are mechanically interconnected, as seen in FIG. 2 of the application drawings. The hydraulic displacement device in one circuit can operate as a motor and, through the mechanical connecting shaft, the other hydraulic displacement device is driven as a pump to transform the mechanical shaft power back into hydraulic power to the hydraulic system having the hydraulic displacement device operating as a pump. It will be evident that this relation between the two hydraulic displacement devices can be reversed in the event that there is a reversal in the hydraulic circuit that has failed.

Other examples of power drive units including control of the displacement of a hydraulic variable displacement axial piston unit are shown in the Flippo Pat. No. 4,191,094 and the Aldrich Pat. No. 4,210,066, owned by the assignee of this application.

Hydraulic power drive units, used either singly or in a redundant combination, for providing a mechanical output and hydraulic power transfer units are known in the prior art; however, there is no known integration of the power drive and power transfer functions into a single unit whereby the hydraulic power drive units are associated with structure whereby they can function to either provide a power drive output or power transfer between hydraulic systems.

SUMMARY OF THE INVENTION

A primary feature of the invention is to provide a power drive and power transfer system wherein a pair of power conversion devices in separate circuits may operate through a gear train having an output connection to drive a load or may operate to transfer power from one circuit to the other by preventing operation of said output connection.

A further feature of the invention is to integrate the hydraulic power drive and hydraulic power transfer systems of an aircraft into a single unit wherein the components of a pair of power drive units can be used to perform both functions with resulting lower cost, less weight and increased reliability of aircraft hydraulic systems.

In the attainment of the foregoing, a pair of power conversion devices, such as hydraulic displacement devices, are connected one in each of a pair of separate power circuits and each have a rotatable drive shaft associated therewith. Gear means interconnect the rotatable drive shafts and an output shaft is connected to the gear means to be driven thereby and transmit power from the power conversion devices to provide a redundant power drive to a mechanical mechanism. When the output shaft is held against rotation, the power conversion devices can be operated to transfer power from one power circuit to the other through the power conversion devices.

More particularly, a pair of hydraulic power drive units, each having a separate hydraulic circuit and each having a hydraulic variable displacement device, have the drive shafts thereof connected to a summing gear train which has an output operatively connected to an output shaft. The operative connection between the summing gear train and the output shaft includes a brake and the summing gear train functions, when the brake is operable, to hold the output shaft against rotation, to transfer hydraulic power from one power drive unit to the other.

As a modification to the system defined in the preceding paragraph, the summing gear train between the power drive units may be a torque-summing gear train. In order to permit transfer of hydraulic power from one power drive unit to the other when the brake holds the output shaft against rotation, there is a clutch between the brake and the torque-summing gear train to permit rotation of the components of the torque-summing gear train while the output shaft is held against rotation.

A primary object of this invention is to provide an integrated power drive and power transfer system for enabling a pair of power drive units, each having a separate hydraulic circuit, to either drive a common output shaft or transfer power from one power drive unit to the other. This system results in a reduction in the number of parts required to provide both the known hydraulic power drive functions and power transfer functions to result in a reduction in cost and weight as well as increased reliability for plural hydraulic systems as used in aircraft.

In an aircraft, there are many flight control surfaces which are mechanically actuated with power drive from redundant power drive units having a common drive connection to the mechanical actuation system. Additionally, there can be plural independent hydraulic systems in the aircraft for operating other aircraft equipment, with there being power transfer mechanism between the systems in the event a pump fails in one of the systems. With the integrated power drive and power transfer system as defined in the preceding paragraph, the number of units required to achieve both functions can be substantially reduced, since hydraulic displacement devices are common to both power drive and power transfer. The power drive unit circuits include components for operating the other aircraft equipment.

Another object of the invention is to provide a power drive and power transfer system comprising, a pair of power conversion devices connected one in each of a pair of separate power circuits and each having a rotatable drive shaft associated therewith, gear means interconnecting said rotatable drive shafts, an output shaft connected to said gear means to be driven thereby and transmit power from said power conversion devices to provide a power drive, and means for holding said output shaft against rotation whereby power may be transferred from one power circuit to the other through said gear means and said power conversion devices.

Still another object of the invention is to provide a system as defined in the preceding paragraph wherein said power circuits are hydraulic circuits and said power conversion devices are hydraulic variable displacement devices operable as a pump or as a motor.

Still another object of the invention is to provide an integrated power drive and power transfer system for enabling a pair of power drive units each having a separate hydraulic circuit to either drive a common output shaft or transfer power from one power drive unit to the other comprising, a pair of variable displacement hydraulic devices one in each of said power drive units and each having a drive shaft, a summing gear train having a pair of inputs connected one to each of said drive shafts and an output, an output shaft operatively connected to said summing gear train output, and a selectively operable brake in said operative connection between the output shaft and the summing gear train output to control either driving of the output shaft with both variable displacement hydraulic devices operating as motors or transfer of power between power drive units with one variable displacement hydraulic device operating as a motor and the other as a pump.

An additional object of the invention is to provide a system as defined in the preceding paragraph wherein the summing gear train can be either a speed-summing gear train or a torque-summing gear train and with the torque-summing gear train having a clutch associated therewith.

DESCRIPTION OF THE DRAWINGS

FIG. 1 is a schematic view of a prior art mechanical drive having a pair of power drive units;

FIG. 2 is a schematic view of a prior art power transfer device;

FIG. 3 is a schematic view of the integrated power drive and power transfer system utilizing a speed-summing gear train;

FIG. 4 is a diagrammatic section taken generally along the line 4—4 in FIG. 3; and FIG. 5 is a schematic view of an integrated power drive and power transfer system utilizing a torque-summing gear train.

DESCRIPTION OF THE PREFERRED EMBODIMENTS

The preferred embodiments of the invention utilize certain components and perform certain functions known in the prior art and previously referred to herein.

A power drive, known in the prior art, is shown in FIG. 1 wherein a pair of hydraulic variable displacement devices 10 and 11, which may be of the axial piston type as shown in my application previously referred to and identified by the legend VD, each have a releasable brake 14 and 15, identified by the legend B, associated therewith. The brakes 14 and 15 selectively release a pair of respective drive shafts 17 and 18 which provide a pair of inputs to a speed-summing gear train 20 which may be in the form of a planetary differential and which has an output connected to a mechanical output shaft 22 which is connectable to a load, such as a mechanical actuation system for an aircraft flight control surface.

Each of the hydraulic variable displacement devices 10 and 11 are part of independent power drive units and have hydraulic lines 24, 26, 28 and 30 as part of the power circuit of the respective power drive units. The hydraulic variable displacement devices 10 and 11 each have a movable wobbler for setting the displacement of the unit and these wobblers have their position set by displacement controls, indicated generally at 32 and 34. The use of the brakes 14 and 15 associated with the hydraulic variable displacement units 10 and 11 is shown in the aforementioned Flippo and Aldrich patents and the disclosure thereof is incorporated herein by reference.

The power transfer function of the prior art is illustrated in FIG. 2 wherein a hydraulic displacement device 40 is in one hydraulic circuit, as indicated by hydraulic lines 42 and 44, and is mechanically connected, as by a shaft 46, to a second hydraulic displacement device 48 which is in a second hydraulic circuit, as illustrated by hydraulic lines 50 and 52. Each of these hydraulic circuits would have a pump supplying power to the hydraulic circuit and, if there is a failure of one pump, the power transfer unit can function to have the displacement device in one hydraulic circuit function as a motor to drive the displacement device in the other hydraulic circuit as a pump to supply power to the hydraulic circuit in which the pump failure has occurred.

A first embodiment of the integrated power drive and power transfer system is shown in FIGS. 3 and 4. An output shaft 60 can be driven from a pair of power drive units, indicated generally at 62 and 64, and which have their mechanical outputs drivingly connected to a speed-summing gear train, indicated generally at 66.

The power drive unit 62 has a hydraulic variable displacement device 68, which may be in the form of an axial piston unit having a wobbler, the position of which can be controlled by a displacement control 70. The hydraulic variable displacement device is connected into the power circuit of the power drive unit by a pair of hydraulic lines 74 and 76. The hydraulic displacement device 68 has a drive shaft 78 connected to a sun gear 80 of a sun-to-sun differential and which meshes with a planet gear 82. A selectively operable brake 72 is associated with the drive shaft 78.

The power drive unit 64 similarly has a hydraulic variable displacement device 84 which may be of the axial piston type and which has a wobbler, the position of which can be controlled by a displacement control 86 in a manner known in the art. The hydraulic displacement device 84 is connected into the power circuit of the power drive unit by a pair of hydraulic lines 88 and 90. A selectively operable brake 92 is associated with the hydraulic displacement device for controlling the rotation of a drive shaft 94 thereof which mounts a sun gear 96 meshing with a second planet gear 98 of the speed-summing gear train.

The planet gears 82 and 98 are offset lengthwise of each other in meshing overlapped relation and are mounted on a carrier 100 mounting a gear 102 which meshes with a gear 104 on the output shaft 60. The output shaft 60 has a selectively operable brake 106 for either holding the output shaft 60 against rotation or permitting rotation thereof and with the brake operable by means of a control 108.

The embodiment of the integrated power drive and power transfer system illustrated in FIGS. 3 and 4 has a pair of separate power circuits, each with a power conversion device in the form of a hydraulic displacement device which is of variable displacement and which are speed-summed in the differential 66 to provide speed and torque at the output shaft 60 when the brake 106 is released. Control means, as disclosed in my application previously referred to, permit the hydraulic displacement devices 68 and 84 to operate as motors when there is an opposing load connected to the output shaft 60 and these devices can operate as pumps when there is an aiding load connected to the output shaft 60.

It will be evident that a third hydraulic displacement device could be connected into the speed-summing gear train by connection to another planet gear thereof.

When the components are to operate as a hydraulic power transfer unit, the output shaft 60 is braked by the brake 106 and a controller sends commands to the displacement controls 70 and 86 and associated valving of the power drive units to have one of the hydraulic variable displacement devices 68 and 84 operate as a pump and the other as a motor. The displacement device that is operating as a motor will transform hydraulic power from that particular power drive unit into mechanical power by transmission through the summing gear train to the other device operating as a pump which transfers hydraulic power from one unit to the other. With the brake 106 engaged, the carrier 100 cannot rotate and, therefore, there is a direct mechanical drive between the sun gears 80 and 96 by the fixed but rotatable planet gears 82 and 98.

Although the integrated power drive and power transfer system has been shown using a pair of hydraulic power drive units each having a hydraulic variable displacement device, it will be evident that there could be a combination of a hydraulic power drive unit and an electric motor, with there being transfer of either hydraulic power to electric power or electric power to hydraulic power. The system could also consist of two power conversion devices in the form of electric motors in separate power circuits.

In the embodiment of FIG. 5, those components which are the same as those shown in the embodiment of FIGS. 3 and 4 have been given the same reference numerals.

The embodiment of FIG. 5 differs from the embodiment of FIGS. 3 and 4 by using a torque-summing gear train wherein the drive shafts 78 and 94 of the respective hydraulic displacement devices 68 and 84 each have the respective gears 120 and 122 meshing with a gear 124 connected to a shaft 126. This shaft 126 connects to an output shaft 128 by operative connections through a selectively-controlled clutch 130 and a selectively-controlled brake 132 which are controlled to be either engaged or disengaged by the respective controls 134 and 136. When there is to be power drive, the clutch 130 is engaged and the brake 132 is released. When there is to be power transfer, the brake 132 is engaged to prevent rotation of the output shaft 128. The clutch 130 must be disengaged to enable rotation of the gear 124 and the shaft 126 whereby mechanical power can be transmitted through the torque-summing gear train from one power drive unit to the other.

The functions of the integrated power drive and power transfer system shown in FIG. 5 are the same as those previously described in connection with the embodiment using the speed-summing gear train whereby the hydraulic variable displacement devices can either operate together to provide a mechanical output of the output shaft 128 or can operate to transfer power from one to the other.

From the foregoing description of the invention, it will be appreciated that the number of components required to perform both power drive and power transfer of functions have been reduced by integration of components to provide a lower cost system with less total weight and higher system reliability.

I claim:

1. A power drive and power transfer system comprising, a pair of power conversion devices connected one in each of a pair of separate power circuits and each having a rotatable drive shaft associated therewith, gear means interconnecting said rotatable drive shafts, an output shaft connected to said gear means to be driven thereby and transmit power from said power conversion devices to provide a power drive, and means for holding said output shaft against rotation whereby power may be transferred from one power circuit to the other through said gear means and said power conversion devices.

2. A system as defined in claim 1 wherein said power circuits are hydraulic circuits and said power conversion devices are hydraulic displacement devices.

3. A system as defined in claim 2 wherein said hydraulic displacement devices are variable displacement devices operable as a pump or as a motor.

4. A system as defined in claim 1 wherein said gear means is a speed-summing gear train having a pair of inputs connected one to each of said drive shafts and an output connected to said output shaft.

5. A system as defined in claim 4 wherein said means for holding said output shaft against rotation comprises a selectively operable brake.

6. A system as defined in claim 1 wherein said gear means is a torque-summing gear train having a gear operatively connected to said drive shafts, and a drive connection between said gear and said output shaft including a clutch and a selectively operable brake.

7. An integrated power drive and power transfer system for enabling a pair of power drive units each having a separate hydraulic circuit to either drive a common output shaft or transfer power from one power drive unit to the other comprising, a pair of variable displacement hydraulic devices one in each of said power drive units and each having a drive shaft, a summing gear train having a pair of inputs connected one to each of said drive shafts and an output, an output shaft operatively connected to said summing gear train output, and a selectively operable brake in said operative connection between the output shaft and the summing gear train output to selectively hold the output shaft against rotation and control either driving of the output shaft with both variable displacement hydraulic devices operating as motors or transfer of power between power drive units with one variable displacement hydraulic device operating as a motor and the other as a pump when the output shaft is held against rotation.

8. An integrated power drive and power transfer system as defined in claim 7 wherein said summing gear train is a torque-summing gear train.

9. An integrated power drive and power transfer system as defined in claim 8 and a clutch in said operative connection between said selectively operable brake and said torque-summing gear train.

10. An integrated power drive and power transfer system as defined in claim 7 wherein said summing gear train is a speed-summing gear train.

11. An integrated power drive and power transfer system as defined in claim 10 wherein said speed-summing gear train is a sun-to-sun gear differential having a pair of sun gears defining said inputs and connected one to each of said drive shafts, and individually geared one to each of a pair of interconnected planet gears mounted on a carrier defining said summing gear train output.

12. An integrated power drive and power transfer system comprising, a pair of hydraulic displacement devices connectable one in each of a pair of hydraulic circuits to receive power therefrom, a pair of rotatable shafts associated one with each of said hydraulic displacement devices and which are drivingly interconnected, an output shaft operatively connected to said drivingly interconnected shafts, and a selectively operable brake engageable for holding said output shaft against rotation to establish a power transfer relation between the hydraulic displacement devices and releasable to permit both of said hydraulic displacement devices to rotate said output shaft.

13. An integrated power drive and power transfer system comprising, a pair of power conversion devices connectable one in each of a pair of circuits to receive power therefrom, a pair of rotatable shafts associated one with each of said power conversion devices and which are drivingly interconnected, an output shaft operatively connected to said drivingly interconnected shafts, and a selectively operable brake engageable for holding said output shaft against rotation to establish a power transfer relation between the power conversion devices and releasable to permit both of said power conversion devices to rotate said output shaft.

14. An integrated power drive and power transfer system as defined in claim 13 wherein said power conversion devices are drivingly interconnected by a speed-summing gear train.

15. An integrated power drive and power transfer system as defined in claim 13 wherein said power conversion devices are drivingly interconnected by a torque-summing gear train, and a clutch between said torque-summing gear train and said brake.

16. An integrated power drive and power transfer system for enabling a pair of power drive units each having a separate hydraulic circuit to either drive a common output shaft in normal operation or transfer power from one power drive unit to the other when there is a power failure in one power drive unit comprising, a pair of variable displacement hydraulic devices one in each of said power drive units to each receive hydraulic power from a separate source connected in its hydraulic circuit and each having a drive shaft, a speed-summing gear train having a pair of inputs connected one to each of said drive shafts and an output, an output shaft operatively connected to said speed-summing gear train output, and a selectively operable brake in said operative connection between the output shaft and the summing gear train output having an inoperative position when both hydraulic circuits are operating normally to permit drive of the output shaft by the drive shafts of both variable displacement hydraulic devices operating as motors and an operative position to prevent rotation of the output shaft with transfer of power from one power drive unit having its variable displacement hydraulic device operating as a motor to the other power drive unit having a power failure and with its variable displacement hydraulic device operating as a pump.

* * * * *